Patented Dec. 30, 1952

2,623,862

UNITED STATES PATENT OFFICE 2,623,862

RUBBER RECLAIMING SOLVENTS

James H. Boyd, Bronxville, N. Y., assignor to Phillips Petroleum Company, a corporation of Delaware No Drawing. Application March 18, 1949, Serial No. 82,270

5 Claims. (Cl. 260—2.3)

This invention relates to rubber reclaiming. In one of its more specific aspects, it relates to an improved solvent for use in reclaiming natural and/or synthetic rubber.

Generally scrap rubber to be reclaimed by the conventional reclamation processes is cut and ground into small pieces which are mechanically treated to remove fibrous materials which may be present in such scrap rubber, usually vulcanized, as that obtained from old automobile tire casings, rubber belts, and the like. Following the removal of fibrous materials, the particulate rubber is subjected to heat and pressure in the presence of an oil having such action on the rubber that it serves to penetrate and swell it and which assists materially in bringing it into condition for reworking. Usually an alkali, such as sodium hydroxide, or a salt such as zinc chloride, is present during the treatment of the stock for the purpose of breaking down any fabric remaining with the rubber and to reduce the percentage of sulfur in the stock. It is to be understood that in the present reclaiming processes, which utilize a reclaiming oil often called a reclaiming solvent, this material does not actually dissolve the rubber so that it may be recovered by precipitation or coagulation, but rather acts as a swelling and softening agent which puts the rubber in better condition for reworking.

The quality of a rubber reclaiming solvent has been usually measured by those skilled in the art by its degree of unsaturation as measured by iodine number. Although such classification may be of value in many cases, it is at best only a rough indication of the rubber reclaiming properties of a particular solvent.

In the modern reclaiming practices, there are two generally accepted methods of digesting the scrap rubber, i. e., treating it with the reclaiming solvent and with caustic. In the autoclave or "wet" process high steam pressure and high temperature are used together to soften and help the reclaiming oil penetrate and swell the rubber more quickly. In the pan process of digestion, heat is used initially to soften the rubber and the pressure of vapors generated under the influence of the heat serves to open up and swell the rubber particles. The autoclave process is generally used when the scrap rubber may retain some fabric content after mechanical separation to remove it. The autoclave process is also preferred if the rubber is difficult to bring into a workable condition or if a high grade of reclaimed rubber is desired. The pan process is usually limited for use on rubber which has no fiber content, such as that obtained from inner tubes and the like, and scrap rubber from mechanical goods in which the reclaimed product need not be brought into a particularly high order of softness and flexibility.

After a suitable digestion period, which may range from 7 to 24 hours and sometimes as high as 40 hours or more, the water-soluble materials are washed from the swollen rubber mass and the latter is sent to a mill which allows only the smaller softened rubber particles to pass through. Any large rubber particles which are unsoftened by insufficient treatment are rejected. These particles are recycled through the process until they have been sufficiently softened and reduced in size.

At present one of the most time-consuming steps of conventional rubber reclaiming operations is the above-mentioned digestion period. An improvement in this step of the process is one of the goals of the industry. The chief factor in determining the time required for completion of this step is the effectiveness of the rubber reclaiming solvent, whose chief purpose is one of swelling and softening the rubber and depolymerizing the large rubber molecules into smaller ones. An improvement in the digestion step, therefore, would be development of a reclaiming solvent which will act more speedily on the rubber to be reclaimed.

There are various types of rubber reclaiming solvents or oils used in the industry today. Aliphatic hydrocarbon oils have been used along with other hydrocarbon cuts which are chiefly aromatic but which are devoid of resin-forming properties and devoid of naphthalene, or with naphthenic oils derived as waste products in the solvent refining of petroleum oils. Other reclaiming oils are those consisting of unpolymerized resin-forming unsaturates of coke oven light oil. Also among these known rubber reclaiming oils are certain clay tower or Gray tower polymers or cuts of these polymers. Although all of these solvents or oils may be satisfactory, it would be of great advantage to decrease the digestion time required for reclaiming rubber by some means.

An object of this invention is to reduce the digestion time of rubber to be reclaimed.

Another object of this invention is to provide an improved rubber reclaiming solvent.

Another object is to reduce the digestion time of natural and synthetic rubber in rubber reclaiming.

Still another object of this invention is to improve presently used rubber reclaiming solvents.

Another object is to provide new rubber reclaiming solvents derived from below-specification clay tower polymers.

Other objects and advantages of my invention will be apparent to one skilled in the art from the accompanying disclosure and discussion.

I have discovered that the effectiveness of conventional rubber reclaiming solvents may be substantially increased by the addition thereto of minor amounts of a cyclopentadiene compound (which term includes cyclopentadiene, its homologs such as methyl cyclopentadiene, and dimers and higher polymers of these compounds). One particularly useful member of this group of materials is dicyclopentadiene. I have further discovered that although some of my reclaiming solvents may have a lower iodine number than known solvents, they have better rubber reclaiming characteristics.

In the broad aspect of my invention, I may employ a substantially pure cyclopentadiene compound as a reclaiming solvent, or I may admix it with a conventional reclaiming solvent or with other hydrocarbon solvents of negligible reclaiming activity such as clay tower polymers, coal tar naphthas, olefinic and/or aromatic distillate fractions obtained from thermal or catalytic cracking operations, acid-soluble oils obtained from hydrofluoric acid alkylation of isoparaffins with olefins, and other hydrocarbon solvents generally boiling in the range of 225 to 500° F. The quantity of cyclopentadiene compound which may be used according to my invention may vary over quite a wide range. A minimum quantity to be used is about 0.5 weight per cent based on the solvent. Amounts as high as 20 weight per cent may be used with good results; however, when a base stock with little or no reclaiming ability is being improved, quantities as high as 50 weight per cent or more may be advantageous. It is also within the scope of my invention to use a substantially pure cyclopentadiene as a rubber reclaiming solvent.

It is not necessary that the cyclopentadiene of my invention be in the pure form when used as an additive to improve a rubber reclaiming oil. It is within the scope of my invention to use a concentrate of a cyclopentadiene containing say 25, 50, or even 75 weight per cent or more of the cyclopentadiene.

One particularly advantageous use of my new rubber reclaiming solvent is in admixture with a quantity of a clay tower polymer fraction which may have some characteristics of a reclaiming solvent, but which may not cause quite as much swelling or depolymerizing as required of present day reclaiming solvents. I do not limit the use of my invention to improving such solvents, because a cyclopentadiene may be added to a hydrocarbon fraction which has no rubber reclaiming qualities whatsoever and thereby make an adequate reclaiming material out of it. Likewise, a generally accepted reclaiming solvent may be further improved by adding thereto dicyclopentadiene or other cyclopentadiene compound.

Although many solvents for the reclamation of rubber are in use today, great quantities of clay tower polymer, or as it is sometimes called, Gray tower polymer, which is obtained as a residual by-product in the refining of gasoline, are used. The following is a minimum specification of a clay tower polymer suitable for use by itself as a rubber reclaiming solvent. The iodine number is given below, although, as discussed above and as shown later on, it is not too significant.

*Specification of clay tower polymer suitable as rubber reclaiming solvent*

Boiling range, °F _____ 225–500.
Specific gravity, 60/60 _____ 0.9.
Flash point, °F _____ Over 80.
Iodine number _____ Over 180.
Viscosity _____ Similar to kerosene or naphtha.

The following is a specification range of a clay tower polymer of good quality for use as a rubber reclaiming solvent.

| | | |
|---|---|---|
| API Gravity @ 60° F | 13– | 17 |
| Specific gravity, 60/60 | 0.95– | 0.984 |
| Iodine No., gm. I$_2$/100 gm. solv | 200– | 250 |
| Pour point, °F | 20 to | −5 |
| Flash point, COC, °F | 220– | 230 |
| Nonvolatile residue, per cent | 60– | 90 |
| Viscosity: | | |
| SUS @ 210° F | 30– | 50 |
| Gardner-Holdt @ 77° F | D– | H |

In practicing my invention utilizing one process for reclaiming used automobile and truck tires, the tires are treated to remove all large pieces of metal. This is done by cutting the bead from the tire with a saw or knife. Next the tires are ground into small pieces varying in size from about 1/8″ to a size which will pass through about a 30 mesh screen. After being ground, the rubber is passed under a magnet to remove small bits of ferrous metals which may be present, coming either from the grinding machine or from nails and the like embedded in the rubber.

Following the above described grinding and cleaning treatments, the rubber is heated with a solution of sodium hydroxide and with a rubber reclaiming solvent disclosed herein in a digester. The sodium hydroxide makes a water soluble material out of the cellulose which will later be washed away after my solvent softens, swells, and depolymerizes the rubber. Usually steam is used to heat the digester and to maintain the desired pressure therein. After sufficient time has elapsed for the majority of the rubber to be digested, the pressure is released and the liquids removed from the rubber. Following this, the rubber is thoroughly washed with water and then dried. Usually the drying takes place in belt dryers at temperatures in the range of about 220 to 260° F. Refining of the thus treated rubber to produce useful products may be carried out in any conventional manner. Often the rubber is milled to make it homogeneous and to remove any large particles of undigested material prior to refining. Suitable operating conditions for carrying out the softening, swelling, and depolymerizing are given hereinbelow.

The above description is set out to give a more clear understanding of the overall rubber reclaiming process. However, my invention is not to be limited to treatment of rubber in this manner. It is equally applicable to rubber treated with zinc chloride or by acid to remove the cellulose constituents. My solvent may also be used with good results in the pan process.

Suitable conditions for carrying out a rubber reclaiming process utilizing the solvents of my invention may vary widely depending upon the particular process used, and the type of rubber being reclaimed, and also upon the solvent used. Generally speaking, contact times may be in the range of 7 to 40 hours, but more usually in the range of say 7 to 24 hours. Suitable pressures may be within the range of 60 to 250 pounds per square inch, and often in the range of 100 to 200 pounds per square inch. Temperatures may fall within the broad range of 300 to 500° F. whereas it is often preferred to operate at temperatures in the range of 370 to 410° F. Suitable quantities of a cyclopentadiene which may be used in a good reclaiming oil may vary greatly depending on the quality of the oil. Generally 0.5 to 50 weight per cent will be satisfactory, however, in many cases 5 to 20 weight per cent will be sufficient. Suitable quantities of reclaiming oil to be used will also vary considerably depending on temperature, pressure, time, and character of the rubber being reclaimed. A broad range is 4 to 30 weight per cent based on the rubber and preferably 4 to 15 per cent.

The following table, Table I, will show the specific advantages which may be obtained by the use of various quantities of a cyclopentadiene with clay tower polymer of low reclaiming quality. The data in this table is compared with a clay tower polymer reclaiming solvent of good quality, the specification for which is listed in the column entitled "Reclaiming Solvent A." Stability of the solvent is indicated in the last two lines of the table which show the change in iodine number and the change in per cent nonvolatile material after sitting for a period of 7 days. The cyclopentadiene compound used in the runs shown in this table comprised a 70 volume per cent concentrate of dicyclopentadiene. The amount of dicyclopentadiene used is based on pure material rather than on the concentrate. This same concentrate was used in the runs, the data from which are shown in Tables II and IV.

TABLE I

*Properties of reclaiming solvent A and mixtures of low quality clay tower polymer with dicyclopentadiene*

| Property | Reclaiming solvent A | Low quality clay tower polymer | Polymer +5 weight percent dicyclopentadiene | Polymer +10 weight percent DCP | Polymer +20 weight percent DCP | Test method |
|---|---|---|---|---|---|---|
| Distillation: | | | | | | ASTM D86-46. |
| I. B. P. | | 418 | 145 | 140 | 130 | |
| 5% | | 435 | 410 | 324 | 320 | |
| 10% | | 446 | 432 | 400 | 340 | |
| 20% | | 470 | 455 | 446 | 350 | |
| 30% | | | 500 | 478 | 434 | |
| Percent rec. at 450° F. | | 11 | 18.5 | 22.0 | 35.0 | Pure Oil Co. mod. |
| Iodine number (Wijs) | 207 | 155 | 167 | 190 | 213 | ASTM, D445-46T. |
| Viscosity, SUS at 100° F. | 220.8 | 224.9 | 173 | 132.8 | 89.9 | ASTM, D875-46T. |
| Bromine No. | | 75.1 | | | | ASTM, D92-46. |
| Flash pt., °F. | 225 | 230 | 215 | 190 | 170 | ASTM, D92-46. |
| Fire pt., °F. | 240 | 245 | 215 | 195 | 170 | ASTM, D154-28. |
| Nonvolatile, percent | 69.5 | 70 | 65 | 62.5 | 56.2 | ASTM, D97-39. |
| Pour pt., °F. | | −30 | −30 | −45 | −60 | ASTM, D129-44. |
| Sulfur, percent | | 0.29 | | | | |
| After 7 days' storage at 53° C. (127.4° F.): | | | | | | Pure Oil Co. mod. |
| Iodine No. (Wijs) | 206 | 157 | 173 | | 208 | ASTM, D154-28. |
| Nonvolatile, percent | 72 | 70 | 68 | | 58 | |

Tables II, III, and IV, following, are given to show swelling effects of a low quality clay tower polymer as compared to a good quality reclaiming solvent both before and after the addition of a cyclopentadiene, in this case dicyclopentadiene. The vulcanized natural rubber used in these three series of runs was all from the same batch and is identified as smoked sheet natural rubber plus 50 parts by weight of Philblack-A carbon black per 100 parts by weight of rubber. The vulcanized synthetic rubber used was also the same in all three series of runs and was GR-S plus 50 parts by weight of Philblack-A per 100 parts by weight of rubber. Both of these rubbers are of the type used in making tire casings. In each of the runs, time was made the variable. Approximately the same temperatures were used throughout the runs (60±1° C.). Also in each run the same volume of swelling material was used and approximately the same quantity of rubber.

TABLE II

*Relative swelling data of reclaiming solvent A and a low quality clay tower polymer showing the effects of dicyclopentadiene at short intervals of swelling*

[Swelling tests—4 hours at 60±1° C.]

| | Reclaiming solvent A | Low quality clay tower polymer | Polymer+5 weight percent DCP | Polymer+10 weight percent DCP | Polymer+20 weight percent DCP |
|---|---|---|---|---|---|
| Iodine No. (Wijs) | 207 | 155 | 167 | 190 | 213 |
| Natural rubber: | | | | | |
| Increase in volume, percent | 62 | 53 | 59 | 70 | 75 |
| Increase in weight, percent | 52 | 44 | 50 | 58 | 62 |
| Synthetic rubber: | | | | | |
| Increase in volume, percent | 48 | 45 | 49 | 54 | 64 |
| Increase in weight, percent | 39 | 37 | 40 | 45 | 52 |

TABLE III

*Relative swelling data, a comparison of low and high iodine number polymers*

[Swelling tests—48 hours at (60-61° C.)]

|  | Reclaiming solvent | Low iodine clay tower polymer |
|---|---|---|
| Iodine No. (Wijs) | 207 | 155 |
| Natural rubber: | | |
| Increase in volume, percent | 149 | 148 |
| Increase in weight, percent | 127 | 126 |
| Synthetic rubber: | | |
| Increase in volume, percent | 135 | 137 |
| Increase in weight, percent | 112 | 113 |

TABLE IV

*Relative swelling data of low quality polymer, showing the effects of dicyclopentadiene at long intervals of swelling*

[Swelling tests—48 hours at (60±1° C.)]

|  | Low iodine clay tower polymer | Polymer +5 weight percent DCP | Polymer +10 weight percent DCP | Polymer +20 weight percent DCP |
|---|---|---|---|---|
| Iodine No. (Wijs) | 155 | 167 | 190 | 213 |
| Natural rubber: | | | | |
| Increase in volume, percent | 161 | 167 | 168 | 177 |
| Increase in weight, percent | 136 | 140 | 142 | 150 |
| Synthetic Rubber: | | | | |
| Increase in volume, percent | 147 | 148 | 150 | 154 |
| Increase in weight, percent | 122 | 122 | 124 | 127 |

Table II shows the improvement effected by the addition of varying quantities of dicyclopentadiene to a low quality clay tower polymer, and also gives a comparison with the results obtained with a known rubber reclaiming solvent. It is to be noted that with the addition of only 5 weight per cent of my solvent that the weight and volume increase of the synthetic rubber are above that obtained by using the known reclaiming solvent. The addition of 10 weight per cent of my solvent gives better results with both natural and synthetic rubber than does the known solvent, however, this would not be apparent from the iodine number which is 17 numbers below that of the known solvent. The addition of 20 per cent of dicyclopentadiene to the polymer shows improvements in all respects.

Table III indicates that over an extended period of time the increase in volume and weight of a rubber to be reclaimed, whether natural or synthetic, may be fairly close to the same whether the iodine number is high or low. Table IV is somewhat similar to Table III, but gives the improvements obtained over an extended period of time using a low quality clay tower polymer as solvent with the addition of varying quantities of dicyclopentadiene.

Still other tests were made on low quality polymer, the results of which are given in the following Table V. The data indicate that the polymer plus the varying quantities of dicyclopentadiene increases in viscosity on standing as does a known rubber reclaiming solvent, although not to such a great extent. Thus still another advantage obtained by using my solvent is shown.

TABLE V

*Storage tests—low quality polymer + dicyclopentadiene concentrate (5%, 10%, 20% by weight—mixtures)*

| Storage Time | Original | | 1st day at 53° C., 127.4° F. | | 2nd day at 53° C., 127.4° F. | | 3rd day at 53° C., 127.4° F. | | 5th day at 53° C., 127.4° F. | | 7th day at 53° C., 127.4° F. | |
|---|---|---|---|---|---|---|---|---|---|---|---|---|
| | SUS at 100° F. | Stormer sec. at 25° C. | SUS at 100° F. | Stormer sec. at 25° C. | SUS at 100° F. | Stormer sec. at 25° C. | SUS at 100° F. | Stormer sec. at 25° C. | SUS at 100° F. | Stormer sec. at 25° C. | SUS at 100° F. | Stormer sec. at 25° C. |
| "Reclaiming resin A" | 220.8 | 37.8 | 231.3 | 39.0 | 241.6 | 41.2 | 259.5 | 41.5 | 264.9 | 44.0 | 286.8 | 49.0 |
| Low iodine polymer | 224.9 | 40.9 | 233.9 | 39.1 | 244.4 | 39.5 | 241.8 | 39.6 | 251.3 | 42.8 | 259.9 | 46.0 |
| Polymer+5 weight percent DCP | 175.2 | 28.7 | 180.3 | 30.2 | 184.9 | 31.5 | 198.2 | 32.0 | 200.8 | 32.7 | 207.7 | 34.3 |
| Polymer+10 weight percent DCP | 135.6 | 21.4 | 140.4 | 23.2 | 143.1 | 22.8 | 150.6 | 24.1 | 160.3 | 25.3 |  |  |
| Polymer+20 weight percent DCP | 90.9 | 14.8 | 93.6 | 15.7 | 95.4 | 15.8 | 100.9 | 15.9 | 103.4 | 16.7 | 110.0 | 17.6 |

The above disclosed data given in Tables I through V show that a very satisfactory rubber reclaiming solvent may be obtained from low iodine number materials, particularly clay tower polymers, by the addition of dicyclopentadiene or other cyclopentadienes. Iodine number may be increased, swelling of rubber is more rapid and of greater volume, and storage characteristics are improved.

Under some conditions the viscosity of the polymer may be decreased by the addition of substantial quantities of a cyclopentadiene. This is very easily overcome by using a polymer cut, the initial boiling point of which is high enough so that the addition of the desired volume of dicyclopentadiene or a cyclopentadiene will keep the viscosity of the mixture within the desired range.

In accordance with my invention a rubber reclaiming oil, a below average rubber reclaiming oil or a hydrocarbon fraction of the desired boiling range, but with substantially no reclaiming properties, is admixed with quantities of a cyclopentadiene, such as dicyclopentadiene or methyl cyclopentadiene, to provide a reclaiming oil of good quality and of good reclaiming characteristics. Such a reclaiming solvent containing added quantities of a cyclopentadiene is mixed in desired quantities with a natural or synthetic rubber to be reclaimed. The digestion process used may be any one of the conventional processes, two of which have been discussed above. The quantity of a cyclopentadiene used in accordance with my invention will obviously vary with the properties of the solvent or oil being improved. Thus, a low grade solvent will require the addition of more cyclopentadiene than a higher grade solvent.

The usual precautions should be taken when handling the cyclopentadienes in as much as toxic fumes may be evolved at elevated temperatures.

Advantages of my invention are quite apparent from the above specification. For example, a cheap hydrocarbon fraction of little rubber reclaiming ability may be made into a very satisfactory rubber reclaiming solvent by the admixture therewith of a quantity of a cyclopentadiene. Similarly, an already satisfactory reclaiming solvent may be markedly improved by the addition of a cyclopentadiene.

Although this invention has been described and exemplified in terms of its preferred modifications, it is understood that various changes may be made without departing from the spirit and scope of the disclosure and of the claims.

I claim:

1. In a process for reclaiming rubber, the step of digesting previously vulcanized scrap rubber selected from the group consisting of natural rubber and rubbery copolymer of butadiene and styrene with a Gray Tower polymer obtained as a residual by-product in the refining of gasoline and ineffective per se as a reclaimant, to which has been added from 5 to 50 weight per cent of dicyclopentadiene sufficient to raise the rubber reclaiming characteristics of said polymer.

2. As a novel rubber reclaiming oil, a Gray Tower polymer obtained as a residual by-product in the refining of gasoline and ineffective per se as a reclaiming oil to which has been added 0.5 to 50 weight per cent of dicyclopentadiene sufficient to improve the reclaiming characteristics of said Gray Tower polymer.

3. As a novel rubber reclaiming oil a Gray Tower polymer obtained as a residual by-product in the refining of gasoline and ineffective per se as a reclaiming oil to which has been added 5 to 20 weight per cent of dicyclopentadiene to raise the rubber reclaiming characteristics thereof.

4. As a novel rubber reclaiming oil a Gray Tower polymer obtained as a residual by-product in the refining of gasoline, boiling in the range of from 225° F. to 500° F. and ineffective per se as a reclaiming oil, to which has been added from 5 to 50 weight per cent of dicyclopentadiene sufficient to raise the reclaiming characteristics of said Gray Tower Polymer.

5. A process for manufacturing an improved rubber reclaiming solvent from a Gray Tower polymer obtained as a residual by-product in the refining of gasoline and ineffective per se as a reclaiming solvent which comprises admixing with said Gray Tower polymer from 0.5 to 50 weight per cent of dicyclopentadiene sufficient to improve the reclaiming characteristics of said polymer.

JAMES H. BOYD.

REFERENCES CITED

The following references are of record in the file of this patent:

UNITED STATES PATENTS

| Number | Name | Date |
| --- | --- | --- |
| 1,263,813 | Sperr | Apr. 23, 1918 |
| 2,319,959 | Tierney | May 25, 1943 |
| 2,324,980 | Kilbourne | July 20, 1943 |
| 2,415,449 | Sverdrup et al. | Feb. 11, 1947 |
| 2,447,732 | Campbell et al. | Aug. 24, 1948 |
| 2,449,879 | Corkery | Sept. 21, 1948 |
| 2,471,496 | Randall | May 31, 1949 |
| 2,494,593 | Sverdrup | Jan. 17, 1950 |

OTHER REFERENCES

Le Beau, Rubber Age. October 1950, pp. 49–56.